(12) United States Patent
Aoki

(10) Patent No.: US 7,836,987 B2
(45) Date of Patent: Nov. 23, 2010

(54) POWER OUTPUT APPARATUS, VEHICLE WITH POWER OUTPUT APPARATUS, AND CONTROL METHOD OF POWER OUTPUT APPARATUS

(75) Inventor: Takanori Aoki, Nissin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/558,636

(22) Filed: Sep. 14, 2009

(65) Prior Publication Data

US 2010/0071975 A1 Mar. 25, 2010

(30) Foreign Application Priority Data

Sep. 19, 2008 (JP) ............................. 2008-241304

(51) Int. Cl.
*B60W 10/06* (2006.01)
*B60W 10/08* (2006.01)
*B60W 10/26* (2006.01)

(52) U.S. Cl. .............................. 180/65.265; 180/65.28; 903/930; 701/22

(58) Field of Classification Search .............. 180/65.21, 180/65.265, 65.275, 65.28, 65.285, 65.29, 180/65.31, 65.6; 903/930; 701/22
See application file for complete search history.

(56) References Cited

U.S. PATENT DOCUMENTS

| 6,278,915 B1 * | 8/2001 | Deguchi et al. ............... 701/22 |
| 7,587,269 B2 * | 9/2009 | Kamichi et al. ............. 701/110 |
| 2007/0215395 A1 * | 9/2007 | Ogata et al. ................ 180/65.2 |

FOREIGN PATENT DOCUMENTS

| JP | 2002058113 A | 2/2002 |
| JP | 2006296183 A | 10/2006 |

* cited by examiner

*Primary Examiner*—J. Allen Shriver, II
*Assistant Examiner*—John D Walters
(74) *Attorney, Agent, or Firm*—Gifford, Krass, Sprinkle, Anderson & Citkowski, P.C.

(57) ABSTRACT

An engine, motors MG1 and MG2 are controlled to ensure a torque demand Tr* to a ring gear shaft without an operation of the engine while restricting a discharge of a battery within a range of an output limit Wout when a driving power demand Pr* is less than an engine start determination power Pref obtained by subtracting an engine start electric power Wcrk and the like from a base output limit Woutb while the operation of the engine is stopped. When the driving power demand Pr* becomes equal to or more than the engine start determination power Pref while the operation of the engine is stopped, the engine, motors MG1 and MG2 are controlled to ensure the torque demand Tr* to the ring gear shaft with a start of the engine while restricting the discharge of the battery within the range of the output limit Wout.

10 Claims, 8 Drawing Sheets

POWER OUTPUT APPARATUS, VEHICLE WITH POWER OUTPUT APPARATUS, AND CONTROL METHOD OF POWER OUTPUT APPARATUS

BACKGROUND OF THE INVENTION

1. Field of the Invention

The present invention relates to a power output apparatus that outputs power to a driveshaft, a vehicle with the power output apparatus, and a control method of the power output apparatus.

2. Description of the Prior Art

Conventionally, Japanese Patent Laid-Open No. 2002-058113 discloses a power output apparatus for a hybrid vehicle equipped with an internal combustion engine and a driving motor respectively outputting a driving power, and a motor that performs a cranking to start the internal combustion engine. The power output apparatus calculates a battery output demand based on a drive point of the internal combustion engine and a torque command of the driving motor, which are respectively set corresponding to an output demand for a driveshaft. When the output demand exceeds a rated power of a battery, the power output apparatus corrects the torque command of the driving motor to keep the output demand at or below an instantaneous output set based on a state of charge of the battery and a battery temperature. The power output apparatus controls the internal combustion engine and the driving motor so that the internal combustion engine is operated at the set drive point and the driving motor is operated in accordance with the set or corrected torque command during only an allowable output time. The power output apparatus ensures sufficient exertion of battery performance and allows size reduction of the battery and the whole power output apparatus in comparison with an apparatus of restricting the output limit of the battery to its rated power. Further, Japanese Patent Laid-Open No. 2006-296183 discloses a power output apparatus that sets an output limit of a battery to a sum of a rated power of the battery and a predetermined extra output amount when an accelerator opening is equal to or more than a threshold value and a predetermined time is elapsed after a previous extra output process and when an internal combustion engine is to be started and a predetermined time is elapsed after a previous extra output process. In the power output apparatus, sufficient exertion of the battery performance is ensured and the battery can be protected appropriately by setting the extra output amount at intervals corresponding to reasons for extra output demands.

SUMMARY OF THE INVENTION

The battery or an accumulator of the power output apparatus generally has a lower limit voltage in a specific voltage range that ensures sufficient battery performance without deterioration. Some type of the battery may begin to deteriorate through continuous discharge at a high electric current even when the output voltage has not yet reached the lower limit voltage. Accordingly, it is necessary to observe the lower limit voltage and to decrease a value of the electric current by a restriction on the discharge thereof as necessary in order to reduce the deterioration of the battery due to the discharge of the battery. However, the restriction on the discharge of the battery increases a start of the internal combustion engine while an operation of the internal combustion engine is stopped and narrows an operation stop region of the internal combustion engine. Thus, it may be difficult to improve fuel consumption or energy efficiency by appropriately executing an intermittent operation that starts or stops the internal combustion engine as necessary.

The present invention has a main object to reduce deterioration of an accumulator due to a discharge thereof and adequately ensure an operation stop region of an internal combustion engine.

The present invention accomplishes the demand mentioned above by the following configurations applied to a power output apparatus, a vehicle with the power output apparatus, and a control method of the power output apparatus.

A power output apparatus according to the present invention is a power output apparatus that outputs power to a driveshaft. The power output apparatus includes an internal combustion engine that outputs power to the driveshaft, a motor that outputs power to the driveshaft, an electric cranking device that performs a cranking to start the internal combustion engine, an accumulator that supplies and receives electric power from the motor and the electric cranking device, a deterioration factor calculation module, an output limit setting module, an output limit correction module, a power demand setting module, and a control module. The deterioration factor calculation module is configured to calculate a deterioration factor based on a value of electric current flowing through the accumulator. The deterioration factor indicates that a deterioration of the accumulator due to a discharge of the accumulator begins when the deterioration factor exceeds a predetermined reference value. The output limit setting module is configured to set an output limit of the accumulator to a base allowable discharging electric power that is an allowable discharging electric power based on a state of the accumulator when the calculated deterioration factor is less than a predetermined limitation start threshold value that is smaller than the reference value. The output limit setting module sets the output limit to electric power smaller than the base allowable discharging electric power so as to make the deterioration factor become equal to or less than the reference value when the calculated deterioration factor is equal to or more than the limitation start threshold value. The output limit correction module is configured to correct the set output limit so as to temporarily increase the output limit when a predetermined condition is satisfied. The power demand setting module is configured to set a power demand required for the driveshaft based on a torque demand that is to be output to the driveshaft. The control module is configured to control the internal combustion engine, the motor and the electric cranking device so as to ensure an output of torque equivalent to the torque demand to the driveshaft without an operation of the internal combustion engine while restricting a discharge electric power of the accumulator within a range of the set or corrected output limit when the set power demand is less than an engine start determination threshold value obtained by subtracting a predetermined electric power from the base allowable discharging electric power while the operation of the internal combustion engine is stopped. The control module controls the internal combustion engine, the motor and the electric cranking device so as to ensure the output of torque equivalent to the torque demand to the driveshaft with a start of the internal combustion engine by the cranking of the electric cranking device while restricting the discharge electric power of the accumulator within the range of the set or corrected output limit when the set power demand is equal to or more than the engine start determination threshold value while the operation of the internal combustion engine is stopped.

In order to determine whether or not the internal combustion engine is to be started while the operation of the internal combustion engine is stopped, the power demand required for the driveshaft may be compared with a threshold value obtained by subtracting a predetermined electric power (for example electric power other than electric power required for driving the vehicle at the start of the internal combustion engine, margin and the like) from an output limit of the accumulator. However, if using such a threshold value based on the output limit of the accumulator, the internal combustion engine is apt to be started while the operation of the internal combustion engine is stopped when the deterioration factor becomes equal to or more than the limitation start threshold value and the output limit is set to electric power smaller than the base allowable discharging electric power. Thus, it may be difficult to improve fuel consumption or energy efficiency by appropriately executing an intermittent operation because an operation stop region of the internal combustion engine is narrowed. In consideration of this, in the power output apparatus, the internal combustion engine, the motor and the electric cranking device are controlled so as to ensure the output of torque equivalent to the torque demand to the driveshaft without the operation of the internal combustion engine while restricting the discharge electric power of the accumulator within the range of the set or corrected output limit when the set power demand is less than the engine start determination threshold value obtained by subtracting the predetermined electric power from the base allowable discharging electric power while the operation of the internal combustion engine is stopped. Further, the internal combustion engine, the motor and the electric cranking device are controlled so as to ensure the output of torque equivalent to the torque demand to the driveshaft with a start of the internal combustion engine by the cranking of the electric cranking device while restricting the discharge electric power of the accumulator within the range of the set or corrected output limit when the set power demand is equal to or more than the engine start determination threshold value while the operation of the internal combustion engine is stopped. By comparing the power demand with the engine start determination threshold value having a tendency of reducing the start of the internal combustion engine in comparison with the threshold value based on the output limit of the accumulator and determining whether or not the internal combustion engine is to be started, the operation stop region of the internal combustion engine can be adequately ensured without being narrowed even when the deterioration factor becomes equal to or more than the limitation start threshold value while the operation of the internal combustion engine is stopped. Further, the discharge electric power of the accumulator is always restricted within the range of the output limit while the power demand is less than the engine start determination threshold value. Thus, power output to the drive shaft may be slightly reduced while the power demand is less than the engine start determination threshold value because the discharge electric power of the accumulator is always restricted within the range of the output limit, however, the deterioration of the accumulator due to the discharge thereof can be prevented from beginning. Accordingly, the power output apparatus is capable of reducing the deterioration of the accumulator due to the discharge thereof and adequately ensuring the operation stop region of the internal combustion engine.

The output limit correction module may be capable of temporarily setting the output limit to electric power equal to or more than the base allowable discharge electric power regardless of a value of the deterioration factor when the power demand is equal to or more than the engine start determination threshold value while the operation of the internal combustion engine is stopped and the internal combustion engine is started by the cranking of the electric cranking device. The accumulator may not be deteriorated even if the discharge electric power of the accumulator exceeds the output limit based on the deterioration factor in a very short time when the deterioration factor becomes equal to or more than the limitation start threshold value. Accordingly, in the power output apparatus, the output limit is temporarily set to the electric power equal to or more than the base allowable discharge electric power regardless of the value of the deterioration factor when the internal combustion engine is started by the cranking of the electric cranking device. Thus, the deterioration of the accumulator due to the discharge thereof can be reduced and the internal combustion engine can be favorably started by the cranking of the electric cranking device.

The output limit correction module may be capable of temporarily setting the output limit to electric power obtained by adding a predetermined temporary increase amount to the base allowable discharging electric power regardless of a value of the deterioration factor when the power demand is equal to or more than the engine start determination threshold value while the operation of the internal combustion engine is stopped and the internal combustion engine is started by the cranking of the electric cranking device.

The output limit correction module may temporarily increase the output limit only after the power demand becomes equal to or more than the engine start determination threshold value when the calculated deterioration factor is equal to or more than the limitation start threshold value. Thus, the internal combustion engine can be favorably started while increasing the output limit to some extent upon the start of the internal combustion engine. Further, the deterioration of the accumulator due to the discharge thereof can be reduced both prior to and subsequent to the start of the internal combustion engine.

The deterioration factor may be a value based on an integrated value of the electric current flowing through the accumulator. Thus, the deterioration factor can be calculated so as to appropriately indicate a deterioration degree of the accumulator.

The engine start determination threshold value may be obtained by subtracting an engine start electric power from the base allowable discharging electric power, the engine start electric power being electric power input or output by the electric cranking device performing the cranking to start the internal combustion engine. Thus, the engine start determination threshold value can be appropriately calculated.

The electric cranking device may be a power generation motor that is capable of inputting and outputting power, and the power output apparatus may further include a three shaft-type power input output structure connected to three shafts, the driveshaft, an engine shaft of the internal combustion engine, and a rotating shaft of the power generation motor. The three shaft-type power input output structure may be configured to input and output power to a residual shaft based on power input from and output to any two shafts among the three shafts.

The accumulator may be a lithium ion secondary battery. The lithium ion secondary battery is characteristic of beginning deterioration due to continuous discharge at a high current level even when the output voltage does not reached to a predetermined lower limit voltage. The invention is thus especially preferable for the power output apparatus including the lithium ion secondary battery as the accumulator. The deterioration factor is, however, not limited to the lithium ion secondary battery but is computable with regard to various other types of batteries, for example, a nickel hydrogen battery. The power output apparatus of the invention may thus be equipped with any suitable type of the accumulator other than the lithium ion secondary battery.

A vehicle according to the present invention is a vehicle including driving wheels connected to a driveshaft. The vehicle includes an internal combustion engine that outputs power to the driveshaft, a motor that outputs power to the driveshaft, an electric cranking device that performs a cranking to start the internal combustion engine, an accumulator that supplies and receives electric power from the motor and the electric cranking device, a deterioration factor calculation module, an output limit setting module, an output limit correction module, a power demand setting module, and a control module. The deterioration factor calculation module is configured to calculate a deterioration factor based on a value of electric current flowing through the accumulator. The deterioration factor indicates that a deterioration of the accumulator due to a discharge of the accumulator begins when the deterioration factor exceeds a predetermined reference value. The output limit setting module is configured to set an output limit of the accumulator to a base allowable discharging electric power that is an allowable discharging electric power based on a state of the accumulator when the calculated deterioration factor is less than a predetermined limitation start threshold value that is smaller than the reference value. The output limit setting module sets the output limit to electric power smaller than the base allowable discharging electric power so as to make the deterioration factor become equal to or less than the reference value when the calculated deterioration factor is equal to or more than the limitation start threshold value. The output limit correction module is configured to correct the set output limit so as to temporarily increase the output limit when a predetermined condition is satisfied. The power demand setting module is configured to set a power demand required for the driveshaft based on a torque demand that is to be output to the driveshaft. The control module is configured to control the internal combustion engine, the motor and the electric cranking device so as to ensure an output of torque equivalent to the torque demand to the driveshaft without an operation of the internal combustion engine while restricting a discharge electric power of the accumulator within a range of the set or corrected output limit when the set power demand is less than an engine start determination threshold value obtained by subtracting a predetermined electric power from the base allowable discharging electric power while the operation of the internal combustion engine is stopped. The control module controls the internal combustion engine, the motor and the electric cranking device so as to ensure the output of torque equivalent to the torque demand to the driveshaft with a start of the internal combustion engine by the cranking of the electric cranking device while restricting the discharge electric power of the accumulator within the range of the set or corrected output limit when the set power demand is equal to or more than the engine start determination threshold value while the operation of the internal combustion engine is stopped. The vehicle is capable of reducing the deterioration of the accumulator due to the discharge thereof and adequately ensuring the operation stop region of the internal combustion engine so as to improve fuel consumption and energy efficiency of the whole vehicle.

A method according to the present invention is a control method of a power output apparatus including a driveshaft, an internal combustion engine that outputs power to the driveshaft, a motor that outputs power to the driveshaft, an electric cranking device that performs a cranking to start the internal combustion engine, and an accumulator that supplies and receives electric power from the motor and the electric cranking device. The control method calculates a deterioration factor based on a value of electric current flowing through the accumulator. The deterioration factor indicates that a deterioration of the accumulator due to a discharge of the accumulator begins when the deterioration factor exceeds a predetermined reference value. The control method sets an output limit of the accumulator to a base allowable discharging electric power that is an allowable discharging electric power based on a state of the accumulator when the calculated deterioration factor is less than a predetermined limitation start threshold value that is smaller than the reference value. When the calculated deterioration factor is equal to or more than the limitation start threshold value, the control method sets the output limit to electric power smaller than the base allowable discharging electric power so as to make the deterioration factor become equal to or less than the reference value. The control method corrects the set output limit so as to temporarily increase the output limit when a predetermined condition is satisfied. The control method controls the internal combustion engine, the motor and the electric cranking device so as to ensure an output of torque equivalent to the torque demand to the driveshaft without an operation of the internal combustion engine while restricting a discharge electric power of the accumulator within a range of the set or corrected output limit when a power demand required for the driveshaft is less than an engine start determination threshold value obtained by subtracting a predetermined electric power from the base allowable discharging electric power while the operation of the internal combustion engine is stopped. The power demand is set based on a torque demand that is to be output to the driveshaft. When the set power demand is equal to or more than the engine start determination threshold value while the operation of the internal combustion engine is stopped, the control method controls the internal combustion engine, the motor and the electric cranking device so as to ensure the output of torque equivalent to the torque demand to the driveshaft with a start of the internal combustion engine by the cranking of the electric cranking device while restricting the discharge electric power of the accumulator within the range of the set or corrected output limit.

By comparing the power demand with the engine start determination threshold value having a tendency of reducing the start of the internal combustion engine in comparison with the threshold value based on the output limit of the accumulator and determining whether or not the internal combustion engine is to be started, the operation stop region of the internal combustion engine can be adequately ensured without being narrowed even when the deterioration factor becomes equal to or more than the limitation start threshold value while the operation of the internal combustion engine is stopped. Further, the discharge electric power of the accumulator is always restricted within the range of the output limit while the power demand is less than the engine start determination threshold value. Thus, power output to the drive shaft may be slightly reduced while the power demand is less than the engine start determination threshold value, however, the deterioration of the accumulator due to the discharge thereof can be prevented from beginning. According to the method, the deterioration of the accumulator due to the discharge thereof can be reduced and the operation stop region of the internal combustion engine can be adequately ensured.

DESCRIPTION OF THE PREFERRED EMBODIMENTS

Hereinafter, the best mode for carrying out the invention will be described with reference to embodiments.

Figure 1:
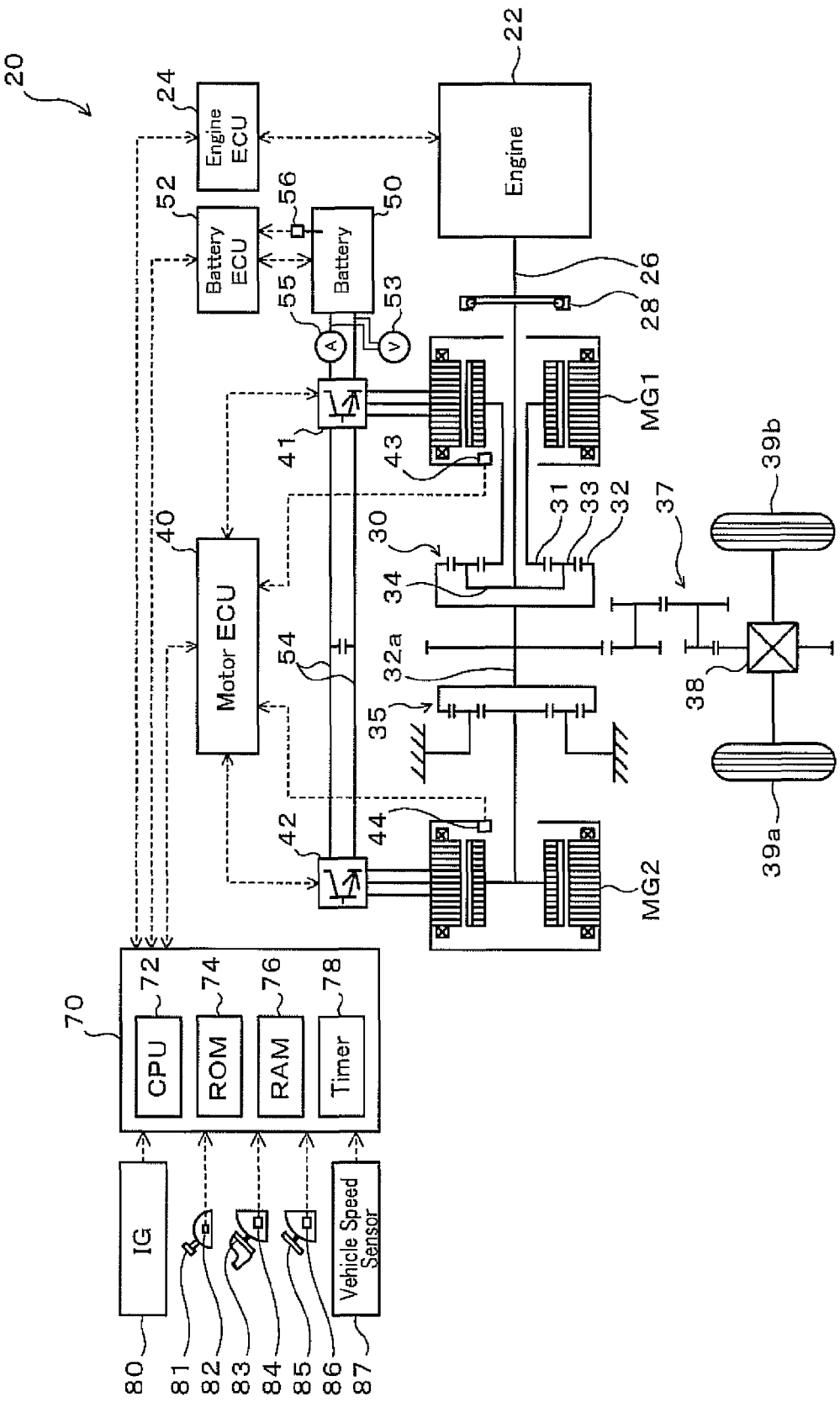
FIG. 1 is a schematic block diagram of a hybrid vehicle 20 according an embodiment of the present invention.

FIG. 1 is a schematic block diagram of a hybrid vehicle 20 according an embodiment of the present invention. The hybrid vehicle 20 of FIG. 1 includes an engine 22, a three shaft-type power distribution integration mechanism 30 connected via a damper 28 to a crankshaft (engine shaft) 26 of the engine 22, a motor MG1 connected to the power distribution integration mechanism 30 and designed to have power generation capability, a reduction gear 35 connected to a ring gear shaft 32a as an driveshaft connected to the power distribution integration mechanism 30, a motor MG2 connected to the ring gear shaft 32a via the reduction gear 35, and a hybrid electronic control unit (hereinafter referred to as "hybrid ECU") configured to control the operations of the whole hybrid vehicle 20.

The engine 22 is an internal combustion engine designed to consume a hydrocarbon fuel, such as gasoline or light oil, and thereby generating power. The engine 22 is under operation controls, such as a fuel injection control, an ignition timing control, an intake air flow control and the like by an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in accordance with control signals from the hybrid ECU 70 and the diverse signals from the various sensors and outputs data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34, the sun gear 31, and the ring gear 32 in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 in accordance with their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41, 42, and the like. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50, a lithium ion secondary battery in this embodiment, is under control and management of a battery electronic control unit 52 (hereinafter referred to as "battery ECU"). The battery ECU 52 inputs various signals required for management and control of the battery 50, for example, an inter-terminal voltage Vb from a voltage sensor 53 disposed between terminals of the battery 50, a charge-discharge current Ib from a current sensor 55 disposed in the power line 54 connecting with the output terminal of the battery 50, and a battery temperature Tb from a temperature sensor 56 attached to the battery 50. The battery ECU 52 outputs data regarding the operating conditions of the battery 50 by data communication to the hybrid ECU 70 and the engine ECU 24 according to the requirements. The battery ECU 52 also performs various arithmetic operations for management and control of the battery 50. A remaining charge or state of charge SOC of the battery 50 is calculated from an integrated value of the charge-discharge current Ib measured by the current sensor 55. A charge-discharge power demand Pb* is set based on the calculated state of charge SOC of the battery 50. An input limit Win as an allowable charging electric power to be charged in the battery 50 and an output limit Wout as an allowable discharging electric power to be discharged from the battery 50 are set in accordance with the calculated state of charge SOC and the battery temperature Tb. The input limit Win of the battery 50 can be set by multiplying a temperature-dependent value based on the battery temperature Tb by an input limit correction coefficient based on the state of charge SOC of the battery 50.

Figure 2:
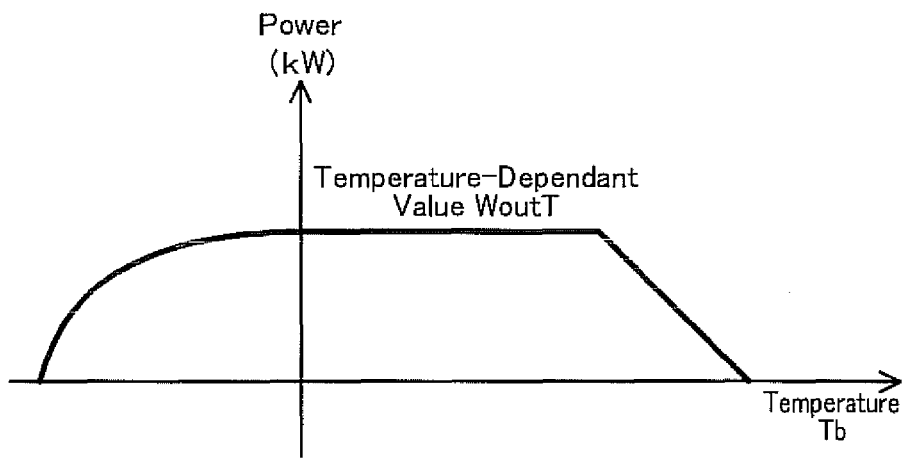
FIG. 2 is an explanatory view exemplifying a relationship between a battery temperature Tb and a temperature-dependent value WoutT of an output limit of a battery 50.
Figure 3:
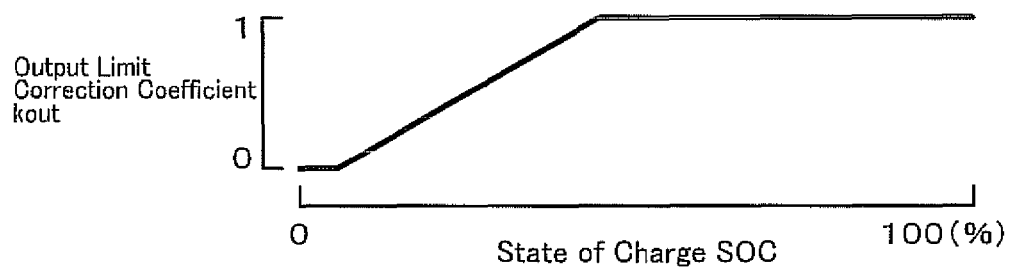
FIG. 3 is an explanatory view exemplifying a relationship between a state of charge SOC of the battery 50 and an output limit correction coefficient kout.
Figure 4:
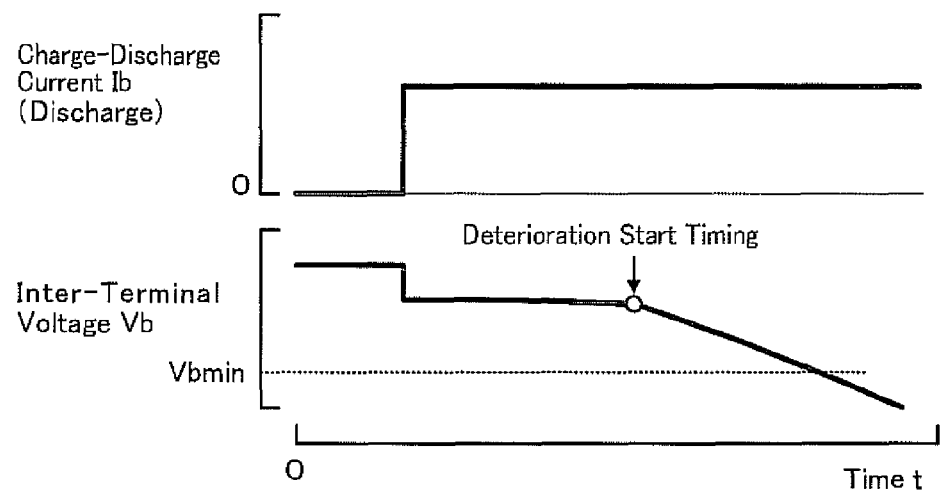
FIG. 4 is an explanatory view exemplifying characteristic of the battery 50.

The output limit Wout of the battery 50 is basically set to a base output limit (base allowable discharging electric power) Woutb that is obtained by multiplying a temperature-dependent value WoutT based on the battery temperature Tb by an output limit correction coefficient kout based on the state of charge SOC of the battery 50. FIG. 2 exemplifies a relationship between the battery temperature Tb and the temperature-dependent value WoutT and FIG. 3 exemplifies a relationship between the state of charge SOC of the battery 50 and the output limit correction coefficient kout. Here, the lithium ion secondary battery is adopted for the battery 50 mounted on the hybrid vehicle 20 of the embodiment as mentioned previously. As is known to those skilled in the art, the lithium ion secondary battery begins to deteriorate due to the continuous discharge at a high current level, even when the inter-terminal voltage Vb has not yet reached a lower limit voltage Vbmin in a specific voltage range of ensuring sufficient battery performance. That is, the lithium ion secondary battery has a relatively abrupt decrease of the inter-terminal voltage Vb with an elapse of time from certain timing (hereinafter referred to as "deterioration start timing") as shown in FIG. 4 in the state of continuous discharge at a relatively high (constant) current level.

By taking into account this characteristic of the lithium ion secondary battery, it is assumed in the embodiment that the deterioration start timing does not come until a deterioration factor D expressed by a differential equation of Equation (1) given below exceeds a predetermined reference value Dlim (value "1" in the embodiment). Laplace transform of both sides of the Equation (1) gives a transfer function of an Equation (2). Accordingly, the deterioration factor D is obtained as the product of a coefficient κ based on the battery temperature Tb and the state of charge SOC, and the integrated value of the charge-discharge current Ib as shown in the Equation (2). In the embodiment, the battery ECU 52 calculates the deterioration factor D in accordance with the Equation (2) at preset time intervals. In the embodiment, the coefficient κ corresponding to the battery temperature Tb and the state of charge SOC given upon the calculation of the deterioration factor D is derived from a previously prepared coefficient setting map (not shown) that defines a relationship between the battery temperature Tb, the state of charge SOC and the coefficient κ.

$$dD/dt + \alpha \cdot D = \beta \cdot Ib \quad (1)$$

$$D = \kappa \cdot \int Ib \cdot dt \quad (2)$$

As seen from the Equation (2), the deterioration factor D increases by continuous discharge of the battery 50 at the high current level, and gradually decreases by continuous charge of the battery 50. Thus, in the embodiment, a limitation start threshold value Dtag is set as a smaller value than the reference value Dlim based on the state of the battery 50, that is, the battery temperature Tb and the state of charge SOC. Then, the output limit Wout is set based on the base output limit Woutb and a difference between the limitation start threshold value Dtag and the deterioration factor D in accordance with an Equation (3) given below when the deterioration factor D becomes equal to or more than the limitation start threshold value Dtag. Thus, the deterioration factor D is kept at or below the reference value Dlim, thereby preventing the deterioration start timing of the battery 50 from coming. The Equation (3) is a relational expression of feedback control for canceling the difference between the limitation start threshold value Dtag and the deterioration factor D. In the Equation (3), 'Kp' and 'Ki' on the right side respectively denote a gain of the proportional and a gain of the integral term. The gain 'Kp' and 'Ki' are defined through experiments and analyses so as to keep the output limit obtained from the Equation (3) as large as possible and prevent the deterioration factor D from exceeding the reference value Dlim.

$$W\text{out} = W\text{out}b + Kp \cdot (D\text{tag} - D) + Ki \cdot \int (D\text{tag} - D) \cdot dt \quad (3)$$

Figure 5:
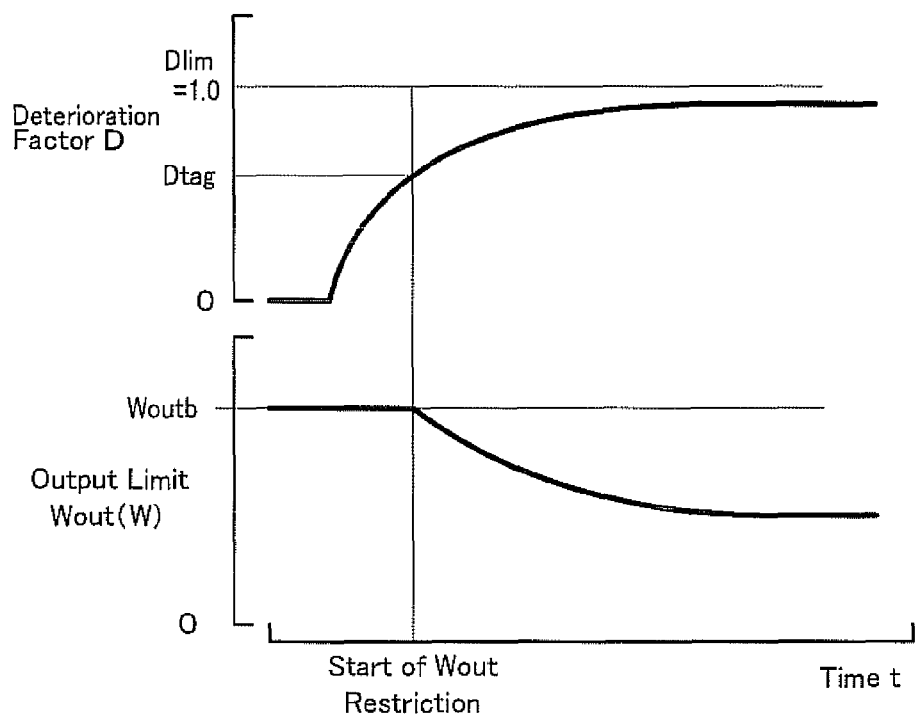
FIG. 5 is an explanatory view exemplifying changes of a deterioration factor D and an output limit Wout upon restricting the output limit Wout based on the deterioration factor D.

As described above, the battery ECU 52 of the embodiment sets the output limit Wout to the base output limit Woutb that is based on the state of the battery 50, that is, the battery temperature Tb and the state of charge SOC when the deterioration factor D is less than the limitation start threshold value Dtag that is smaller than the reference value Dlim. When the deterioration factor D becomes equal to or more than the limitation start threshold value Dtag, the battery ECU 52 sets the output limit Wout based on the base output limit Woutb, the deterioration factor D and the limitation start threshold value Dtag in accordance with the Equation (3). FIG. 5 exemplifies a time-change of the output limit Wout set by the battery ECU 52. As shown in FIG. 5, the output limit Wout of the battery 50 is set to a value smaller than the base output limit Woutb and decreased with increasing the deterioration factor D so as to prevent the deterioration factor D from exceeding the reference value Dlim.

The hybrid ECU 70 is constructed as a microprocessor including a CPU 72, a ROM 74 configured to store processing programs, a RAM 76 configured to temporarily store data, a timer 78 configured to perform a time measurement process in response to a time measurement command, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount (operation amount) of an accelerator pedal 83 from an accelerator pedal position sensor 84, a brake pedal stroke BS or the driver's depression amount of a brake pedal 85 from a brake pedal stroke sensor 86, a vehicle speed V from a vehicle speed sensor 87, and the like. As described above, the hybrid ECU 70 is connected via the communication port with the engine ECU 24, the motor ECU 40, the battery ECU 52, the brake ECU 95 and the like, and exchanges various control signals and data with the engine ECU 24, the motor ECU 40, the battery ECU 52, and the like.

The hybrid vehicle 20 of the embodiment constructed as described above basically sets a target torque Tr* to be output to the ring gear shaft 32a or the driveshaft based on the vehicle speed V and the accelerator opening Acc corresponding to the driver's depression amount of the accelerator pedal 83, and controls the operations of the engine 22, the motors MG1 and MG2 to ensure output of torque based on the target torque Tr* to the ring gear shaft 32a. There are several drive control modes of the engine 22, the motors MG1 and MG2. In a torque conversion drive mode, while the engine 22 is driven and controlled to ensure output of power equivalent to the target torque Tr*, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand based on the target torque Tr* and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the target torque Tr* to the ring gear shaft 32a, while the engine 22 stops its operation. Further, in the hybrid vehicle 20, an intermittent operation of the engine 22 that automatically stops and restarts the engine 22 is performed when a predetermined intermittent permissive condition is satisfied in the torque conversion drive mode and charge-discharge drive mode.

Figure 6:
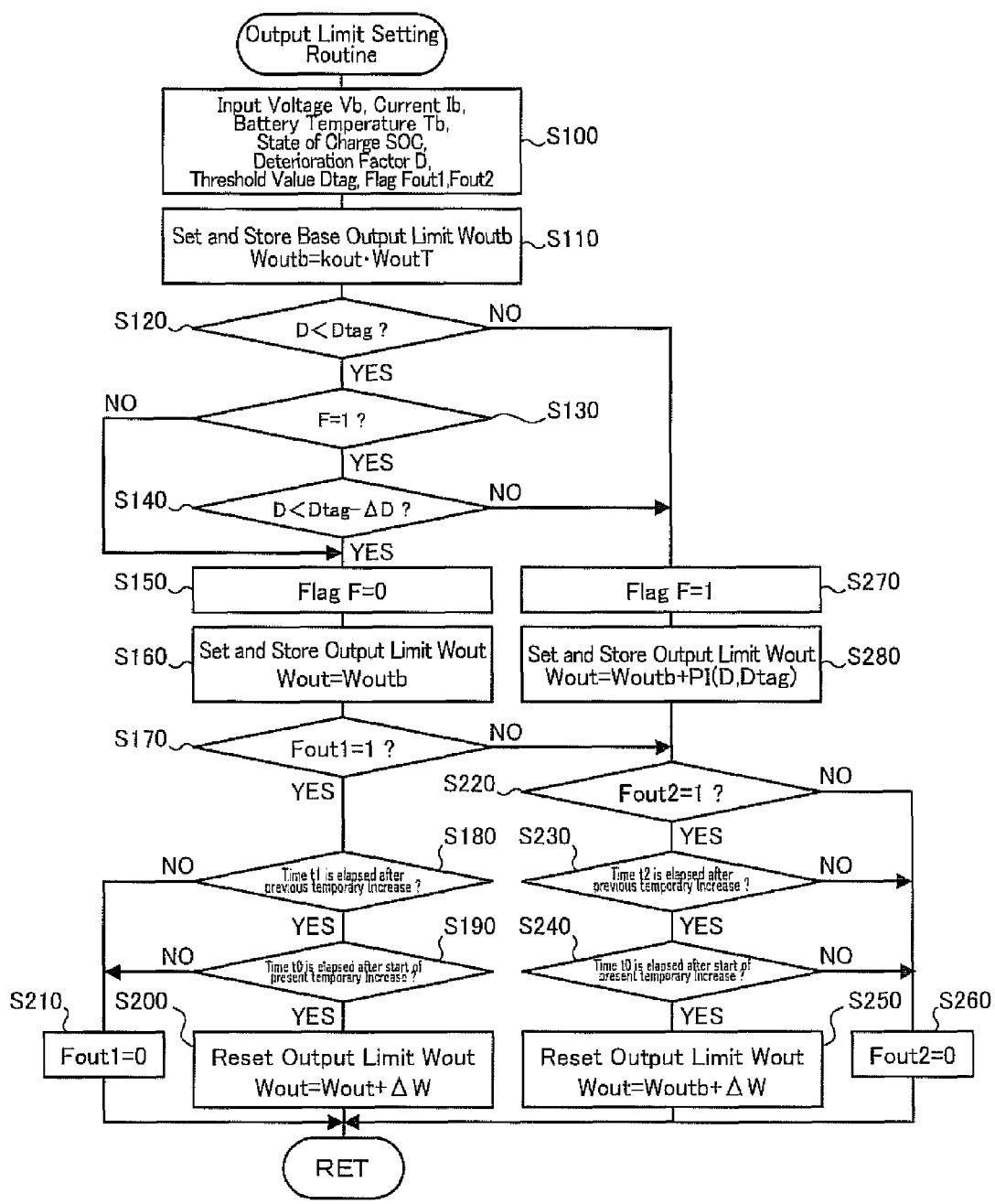
FIG. 6 is a flowchart exemplifying an output limit setting routine executed by a battery ECU 52 of the embodiment.

Next, a setting process of the output limit Wout of the battery 50 will be described. FIG. 6 is a flowchart exemplifying an output limit setting routine executed by the battery ECU 52 of the embodiment. The routine is executed by the battery ECU 52 at preset time intervals after the ignition switch 80 is turned on.

At the start of the output limit setting routine of FIG. 6, a CPU (not shown) of the battery ECU 52 executes an input process of data required for the control such as the inter-terminal voltage Vb from the voltage sensor 53, the charge-discharge current Ib from the current sensor 55, the battery temperature Tb from the temperature sensor 56, the state of charge SOC that is separately calculated, the deterioration factor D, the limitation start threshold value Dtag, an extra output demand flag Fout1 and Fout2 from the hybrid ECU 70 (Step S100). The extra output demand flag Fout1 is normally set to value "0" during a driving of the hybrid vehicle 20 by the hybrid ECU 70 and is set to value "1" when the accelerator opening Acc by the driver is equal to or more than a predetermined threshold value Aref. The hybrid ECU 70 determines that a degree of a driving force (torque) demand (a degree of an acceleration demand) is relatively large when the accelerator opening Acc is equal to or more than the threshold value Aref, and sets the extra output demand flag Fout1 to value "1" so as to require the battery 50 side to temporarily increase the output limit Wout. The extra output demand flag Fout2 is normally set to value "0" during the driving of the hybrid vehicle 20 by the hybrid ECU 70 and is set to value "1" so as to require the battery 50 side to temporarily increase the output limit Wout when the engine 22 is to be started while the operation of the engine 22 is stopped.

After the data input at Step S100, the CPU sets the base output limit Woutb based on the battery temperature Tb and the state of charge SOC by multiplying the temperature-dependent value WoutT derived from a map defining relationship (See FIG. 2) between the battery temperature Tb and the temperature-dependent value WoutT by the output limit correction coefficient kout derived from a map defining relationship (See FIG. 2) between the state of charge SOC and the output limit correction coefficient kout and stores the set base output limit Woutb in a predetermined memory region of a RAM that is not shown (Step S110). Then, the CPU determines whether or not the deterioration factor D is less than the limitation start threshold value Dtag (Step S120). When the deterioration factor D is less than the limitation start threshold value Dtag, the CPU determines whether or not a flag F is value "0" (Step S130). The flag F is set to value "1" when the output limit Wout is restricted base on the deterioration factor D. When the flag F is value "0", the CPU holds the flag F at value "0" (Step S150), sets the output limit Wout to the base output limit Woutb set at Step S110, and stores the set output limit Wout in a predetermined memory region of the RAM (Step S160).

When the deterioration factor D is not restricted based on the output limit Wout and the output limit Wout is set to the base output limit Woutb at Step S160, the CPU determines whether or not the extra output demand flag Fout1 input at Step S100 is value "1" (Step S170). When the extra output demand flag Fout1 is set to value "1" due to an increase of the degree of the driving force demand, the CPU determines whether or not a predetermined time t1 is elapsed after a previous temporary increase of the output limit Wout of the battery 50 (Step S180). When the predetermined time t1 is elapsed after a start of the previous temporary increase of the output limit Wout, the CPU determines whether or not a predetermined time t0 is elapsed after a start of the present temporary increase of the output limit Wout of the battery 50 (Step S190). When the predetermined time t0 is not elapsed after a start of the present temporary increase of the output limit Wout, the CPU resets the output limit Wout to a sum of the output limit Wout set at Step S160 and a predetermined temporary increase amount $\Delta W$ (for example, about 6 kW), and stores the reset output limit Wout in the memory region (Step S200). When a negative determination is made at Steps S180 or S190, the CPU sets the extra output demand flag Fout1 to value "0" (Step S210) and returns to Step S100 to repeat the processes of and after Step S100 without the reset of the output limit Wout set at Step S160. In the embodiment, the temporary increase amount $\Delta W$ is set to a sum of electric power required for cranking the engine 22 by the motor MG1 to start the engine 22 once (for example, about 5 kW) and electric power required for continuing the driving of the hybrid vehicle 20 with power from the motor MG2 (for example, about 1 kW) for example.

When determined that the extra output demand flag Fout1 is value "0", the CPU determines whether or not the extra output demand flag Fout2 is value "1" (Step S220). When the extra output demand flag Fout2 is set to value "1" due to a start demand of the engine 22, the CPU whether or not a predetermined time t2 is elapsed after the previous temporary increase of the output limit Wout of the battery 50 (Step S230). When the predetermined time t2 is elapsed after the start of the previous temporary increase of the output limit Wout, the CPU determines whether or not a predetermined time t0 is elapsed after the present temporary increase of the output limit Wout of the battery 50 (Step S240). When the predetermined time t0 is not elapsed after the start of the present temporary increase of the output limit Wout, the CPU resets the output limit Wout to the sum of the base output limit Woutb set at Step S110 and the predetermined temporary increase amount ΔW, and stores the reset output limit Wout in the memory region (Step S250). When a negative determination is made at Steps S220, S230 or S240, the CPU sets the extra output demand flag Fout2 to value "0" (Step S260) and returns to Step S100 to repeat the processes of and after Step S100 without the reset of the output limit Wout set at Step S160.

On the other hand, when determined that the deterioration factor D is equal to or more than the limitation start threshold value Dtag, the CPU holds the flag F at value "1" (Step S270) and sets the output limit Wout in accordance with the above Equation (3) so as to retain the deterioration factor D equal to or less than the reference value Dlim and to prevent the deterioration start timing of the battery 50 from coming (Step S280). Then, the CPU determines whether or not the extra output demand flag Fout2 is value "1" (Step S220) without the determination regarding the extra output demand flag Fout1. When the extra output demand flag Fout2 is set to value "1" due to a start demand of the engine 22 and positive determinations are made at Step S230 and S240, the CPU resets the output limit Wout to the sum of the base output limit Woutb set at Step S110 and the temporary increase amount ΔW (for example, about 6 kW), and stores the reset output limit Wout in the memory region (Step S250). Then, the CPU returns to Step S100 to repeat the processes of and after Step S100. When determined that the deterioration factor D is equal to or more than the limitation start threshold value Dtag at Step S120, the flag F is set to value "1" (Step S270), so that a positive determination is made at Step S130. In this case, the deterioration factor D is compared with a value obtained by subtracting a predetermined value ΔD from the limitation start threshold value Dtag (Step S140). Then, the processes of and after Step S270 are executed until Step S140 determines that the deterioration factor D is less than the value (Dtag−ΔD). Thus, in the hybrid vehicle 20 of the embodiment, the limitation of the output limit Wout based on the deterioration factor D is performed until the deterioration factor D becomes less than the value (Dtag−ΔD) that is smaller than the limitation start threshold value Dtag.

As described above, when the deterioration factor D is less than the limitation start threshold value Dtag (the value (Dtag−ΔD) after the deterioration factor D exceeds the deterioration factor D once), the output limit Wout is set to the base output limit Woutb based on the state of the battery 50 (Step S160). When the extra output demand flag Fout1 is set to value "1" due to the increase of the degree of the driving force demand or the extra output demand flag Fout2 is set to value "1" due to the start demand of the engine 22, the output limit Wout is temporarily (by the predetermined time t0) set to electric power equal to or more than the base output limit Woutb, that is electric power obtained by adding the temporary increase amount ΔW to the base output limit Woutb (Steps S200, S250). When the deterioration factor D is equal to or more than the limitation start threshold value Dtag, the output limit Wout is basically set to smaller electric power than the base output limit Woutb in accordance with the above Equation (3) so as to retain the deterioration factor D equal to or less than the reference value Dlim (Step S280). When the deterioration factor D is equal to or more than the limitation start threshold value Dtag, the output limit Wout is temporarily (by the predetermined time t0) set to electric power equal to or more than the base output limit Woutb, that is electric power obtained by adding the temporary increase amount ΔW to the base output limit Woutb (Steps S250) on the condition that the extra output demand flag Fout2 is set to value "1" due to the start demand of the engine 22. The battery 50 may not be deteriorated even if the limitation of the output limit Wout based on the deterioration factor D is released or the increase of the output limit is allowed in a very short time when the deterioration factor D becomes equal to or more than the limitation start threshold value Dtag.

Figure 7:
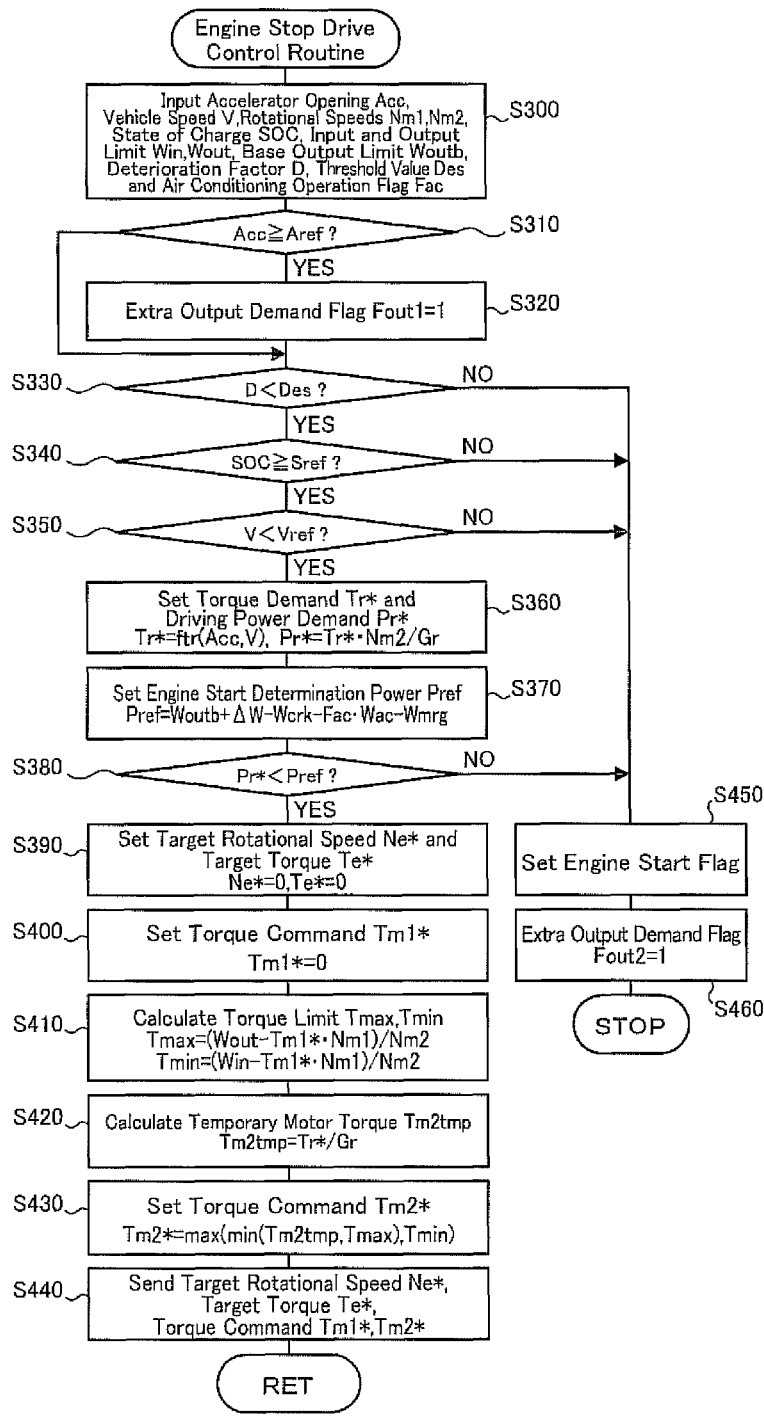
FIG. 7 is a flowchart exemplifying an engine stop drive control routine executed by a hybrid ECU 70 of the embodiment.

Subsequently, an operation of the hybrid vehicle 20 driven in the motor drive mode and an operation of the hybrid vehicle 20 when the engine 22 is started during the motor drive are described. FIG. 7 is a flowchart exemplifying an engine stop drive control routine executed by the hybrid ECU 70 of the embodiment. The routine is executed by the hybrid ECU 70 at preset time intervals (for example, at every several msec) when the accelerator pedal 83 is depressed by the driver so as to drive the hybrid vehicle 20 without the operation of the engine 22.

At the start of the engine stop drive control routine of FIG. 7, the CPU 72 of the hybrid ECU 70 executes an input process of data required for the control such as the accelerator opening Acc from the accelerator pedal position sensor 84, the vehicle speed V from the vehicle speed sensor 87, the rotation speeds Nm1 and Nm2 of the motors MG1 and MG2, the state of charge of the battery 52, the input limit Win and the output limit Wout, the base output limit Woutb, the deterioration factor D, an engine start determination threshold value Des, and an air conditioning operation flag Fac (step S300). The rotation speeds Nm1 and Nm2 of the motors MG1 and MG2 are input from the motor ECU 40 by communication. The state of charge SOC, the input limit Win, the output limit Wout, the base output limit Woutb, the deterioration factor D, and the engine start determination threshold value Des are input from the battery ECU 52 by communication. The base output limit Woutb and the output limit Wout are set through the above output limit setting routine. The engine start determination threshold value Des is compared with the deterioration factor D so as to determine whether or not the engine 22 is started and is set based on the battery temperature Tb and the state of charge SOC by the hybrid ECU 70. The battery ECU 52 sets the engine start determination threshold value Des to a value that is smaller than the above reference value Dlim and enables an output of electric power of a predetermined amount (for example, about 6 kW) from the battery 50 after the deterioration factor D becomes equal to or more than the engine start determination threshold value Des and the engine 22 is started. The air conditioning operation flag Fac is set to value "0" when an air conditioning ON/OFF switch disposed on an instrument panel or the like in the vehicle room for instructing an operation or a stop of a vehicle room air conditioning unit (not shown) mounted on the hybrid vehicle 20, and is set to value "1" when the air conditioning ON/OFF switch is turned on. The air conditioning operation flag Fac is input from an air conditioning electronic control unit (not shown) that controls the vehicle room air conditioning unit by communication.

After the data input at Step S300, the CPU 72 determines whether or not the input accelerator opening Acc is equal to or more than a predetermined threshold value Aref (Step S310). When the accelerator opening Acc is equal to or more than the threshold value Aref, the degree of the driving force (torque) demand (the degree of the acceleration demand) may be relatively large, so that the CPU 72 sets the above extra output demand flag Fout1 to value "1" (Step S320). In the embodiment, the threshold value Aref is set to 70% or 80% for example. When the accelerator opening Acc is less than the threshold value Aref, the process of Step S320 is skipped.

After the processes of Step S310 or 5320, the CPU 72 compares the deterioration factor D input at Step S300 with the engine start determination threshold value Des (S330). When the deterioration factor D is less than the engine start determination threshold value Des, the CPU 72 determines whether or not the state of charge SOC input at Step S300 is equal to or more than a predetermined lower limit state of charge Sref (for example, 30-40%) at Step S340. When the state of charge SOC is equal to or more than the lower limit state of charge Sref, the CPU 72 determines whether or not the vehicle speed V input at Step S300 is less than a predetermined intermittent prohibition vehicle speed Vref (Step S350). The intermittent prohibition vehicle speed Vref is set to a lower limit value of a vehicle speed region in which the intermittent operation of the engine 22 is prohibited due to a requirement of the operation of the engine 22, for example. The intermittent prohibition vehicle speed Vref may be set so as to change in accordance with the state of the battery 50, a state of the engine 22, and/or a driving state of the hybrid vehicle 20.

Figure 8:
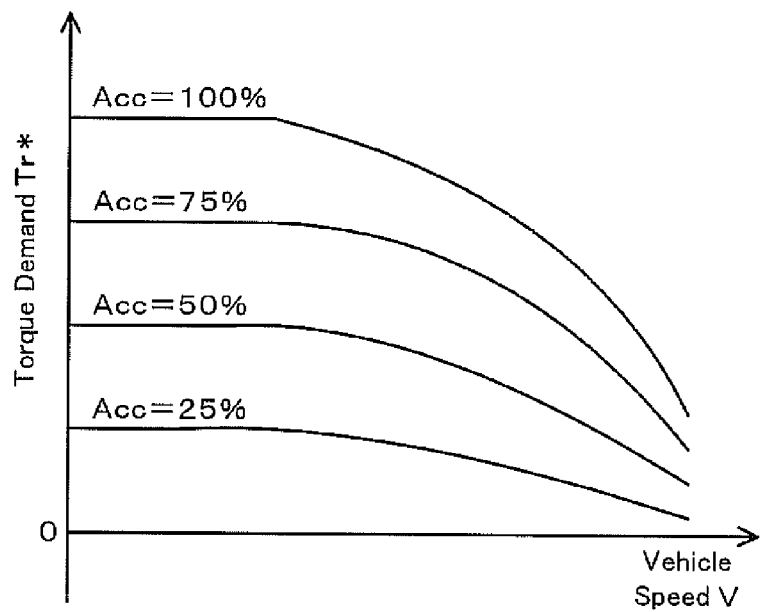
FIG. 8 is an explanatory view exemplifying a torque demand setting map.

When the vehicle speed V is less than the intermittent prohibition vehicle speed Vref at Step S350, the CPU 72 sets the torque demand Tr* to be output to the ring gear shaft 32a or the driveshaft connected to drive wheels 39a and 39b based on the accelerator opening Acc and the vehicle speed V and sets a driving power demand Pr* required for driving the hybrid vehicle 20 (ring gear shaft 32a) at Step S360. In the embodiment, the torque demand Tr* corresponding to the given accelerator opening Acc and the given vehicle speed V is derived from a torque demand setting map previously stored in the ROM 74 and defining a relationship between the accelerator opening Acc, the vehicle speed V and the torque demand Tr*. FIG. 8 illustrates an example of the torque demand setting map. In the embodiment, the driving power demand Pr* is set to a value obtained by multiplying the torque demand Tr* by a rotational speed Nr of the ring gear shaft 32a. The rotational speed Nr of the ring gear shaft 32a is obtained by dividing the rotational speed Nm2 of the motor MG2 by a gear ratio Gr of the reduction gear 35 or by multiplying the vehicle speed V by a predetermined conversion factor.

Then, the CPU 72 sets an engine start determination power Pref that is compared with the driving power demand Pr* so as to determine whether or not the engine 22 is to be started in accordance with a following Equation (4) based on the base output limit Woutb input at Step S300, the temporary increase amount ΔW, the air conditioning operation flag Fac and the like (Step S370). The Equation (4) derives the engine start determination power Pref by subtracting an engine start electric power Wcrk, a product of an air conditioning electric power Wac (electric power for driving a compressor and the like) and the value of the air conditioning flag Fac (Wac=0 at Fac=0) and a margin electric power Wmrg from the sum of the base output limit Woutb and the temporary increase amount ΔW. The engine start electric power Wcrk is electric power input or output by the motor MG1 performing a cranking to start the engine 22.

$$Pref = Woutb + \Delta W - Wcrk - Fac \cdot Wac - Wmrg \quad (4)$$

In order to determine whether or not the engine 22 is started while the operation of the engine 22 is stopped, the driving power demand Pr* may be compared with a threshold value obtained by subtracting the engine start electric power Wcrk and the like from the output limit Wout of the battery 50. However, the threshold value based on the output limit Wout becomes a relatively small value when the deterioration factor D becomes equal to or more than the limitation start threshold value Dtag, so that the output limit Wout is set to the smaller electric power than the base output limit Woutb at Step S280 of the above output limit setting routine. Accordingly, if using the threshold value based on the output limit Wout, the engine 22 may be apt to be started while the operation of the internal combustion engine is stopped and an operation stop region may be narrowed, so that it may be difficult to improve fuel consumption or energy efficiency by appropriately executing the intermittent operation. In consideration of this, in the hybrid vehicle 20 of the embodiment, the engine start determination power Pref is set to be obtained by subtracting the engine start electric power Wcrk and the like from the base output limit Woutb in which the deterioration factor D is not taken into consideration.

Figure 9:
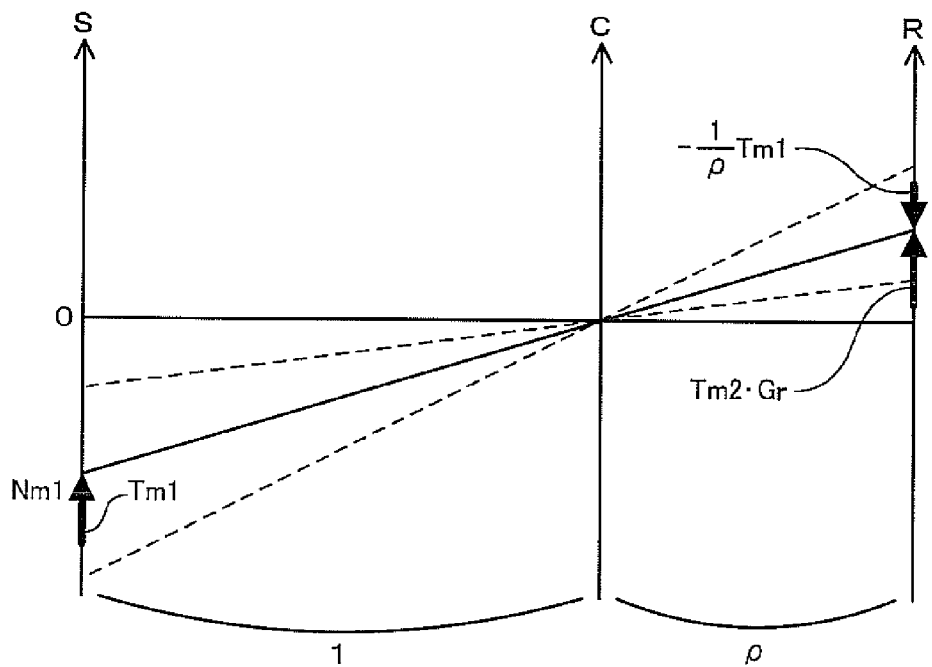
FIG. 9 is an explanatory view exemplifying an alignment chart showing a dynamic relationship between a rotational speed and torque of each rotating element of a power distribution and integration mechanism 30.

As shown in FIG. 9, the higher the vehicle speed V at a start of the cranking of the engine 22 (see a broken line in FIG. 9), the rotational speed Nm1 of the motor MG1 becomes higher in negative side and an amount of electric power generation by the motor MG1 increases, so that electric power required for the cranking of the engine 22 decreases. In consideration of this, in the embodiment, the engine start electric power Wcrk corresponding to the vehicle speed V input at Step S300 is derived from a map (not shown) that is previously prepared to define a relationship between the vehicle speed V and the engine start electric power Wcrk. In FIG. 9, the left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick arrows on the axis 'R' respectively show a torque applied to the ring gear shaft 32a by output of the torque Tm1 from the motor MG1 ($-1/\rho \cdot Tm1^*$) upon the cranking of the engine 22, and a torque applied to the ring gear shaft 32a via the reduction gear 35 by output of the torque Tm2 from the motor MG2 so as to cancel the torque applied to the ring gear shaft 32a by the motor MG1 and to output the torque demand Tr*. The engine start electric power Wcrk may be a sum of the torque applied to the ring gear shaft 32a upon the cranking and the torque applied to the ring gear shaft 32a by the motor MG2 so as to cancel the torque applied to the ring gear shaft 32a by the motor MG1 upon the cranking. Further, in the embodiment, air conditioning electric power Wac required for the air conditioning of the vehicle room is a constant value (for example, about several kW) defined through experiments and analyses based on performance of the air conditioning unit.

After setting the engine start determination power Pref, the CPU 72 determines whether or not the driving power demand Pr* set at Step S360 is less than the engine start determination power Pref (Step S380). When the driving power demand Pr* is less than the engine start determination power Pref, the CPU 72 determines that the engine 22 is not necessary to start the engine 22, sets a target rotational speed Ne* and a target torque Te* of the engine 22 to value "0" (Step S390) and sets the torque command Tm1* of the motor MG1 to value "0" (Step S400). Then, the CPU 72 calculates a lower torque limit Tmin and an upper torque limit Tmax as allowable minimum and maximum torques to be output from the motor MG2 in accordance with Equations (5) and (6) given below by dividing a deviation between the output limit Wout or the input limit Win of the battery 50 and power consumption (generated electric power) of the motor MG1 that is a product of the torque command Tm1* and the current rotational speed Nm1 of the motor MG1 by the rotational speed Nm2 of the motor MG2 (Step s410). Further, the CPU 72 calculates a temporary motor torque Tm2tmp as a torque value to be output from the motor MG2 by dividing the torque demand Tr* by the gear ratio Gr of the reduction gear 35 in accordance with an Equation (7) given below (Step S420). Then, the CPU 72 sets a torque command Tm2* of the motor MG2 to a value obtained by restricting the calculated temporary motor torque Tm2tmp by the lower and the upper torque limits Tmin and Tmax (Step S430). Setting the torque command Tm2* of the motor MG2 in this manner restricts the torque to be output to the ring gear shaft 32a or the driveshaft in the range of the input limit Win of the battery 50 and the base output limit Woutb or the output limit Wout that is restricted based on the deterioration factor D. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 40 (Step S440) and returns to Step S300 to repeat the processing of and after Step S300. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*.

$$Tmin=(Win-Tm1^*Nm1)/Nm2 \quad (5)$$

$$Tmax=(Wout-Tm1^*Nm1)/Nm2 \quad (6)$$

$$Tm2tmp=Tr^*/Gr \quad (7)$$

On the other hand, when the deterioration factor D is equal to or more than the engine start determination threshold value Des (Step S330), the CPU 72 sets an engine start flag so as to start the engine 22 of which operation is stopped (Step S450) and sets the extra output demand flag Fout2 to value "1" so as to require the battery 50 side to temporarily increase the output limit Wout (Step S460). Then, the CPU 72 terminates the routine. When the state of charge SOC of the battery 50 is less than the lower limit state of charge Sref (Step S340), the CPU 72 sets the engine start flag so as to allow charging the battery 50 with electric power generated by the motor MG1 through the use of at least part of power from the engine 22 (Step S450) and sets the extra output demand flag Fout2 to value "1" (Step S460). Then, the CPU 72 terminates the routine. Further, when determined that the vehicle speed V is equal to or more than the intermittent prohibition vehicle speed Vref at Step S350, the CPU 72 sets the engine start flag so as to ensure accelerator performance and the like by enabling to output power from the engine 22 to the ring gear shaft 32a (Step S450) and sets the extra output demand flag Fout2 to value "1" (Step S460). Then, the CPU 72 terminates the routine. When determined that the driving power demand Pr* becomes equal to or more than the engine start determination power Pref at Step S380, the CPU 72 determines that the electric power from the battery 50 is not enough to output the driving power demand Pr*, sets the engine start flag (Step S450) and sets the extra output demand flag Fout2 to value "1" (Step S460). Then, the CPU 72 terminates the routine.

Figure 10:
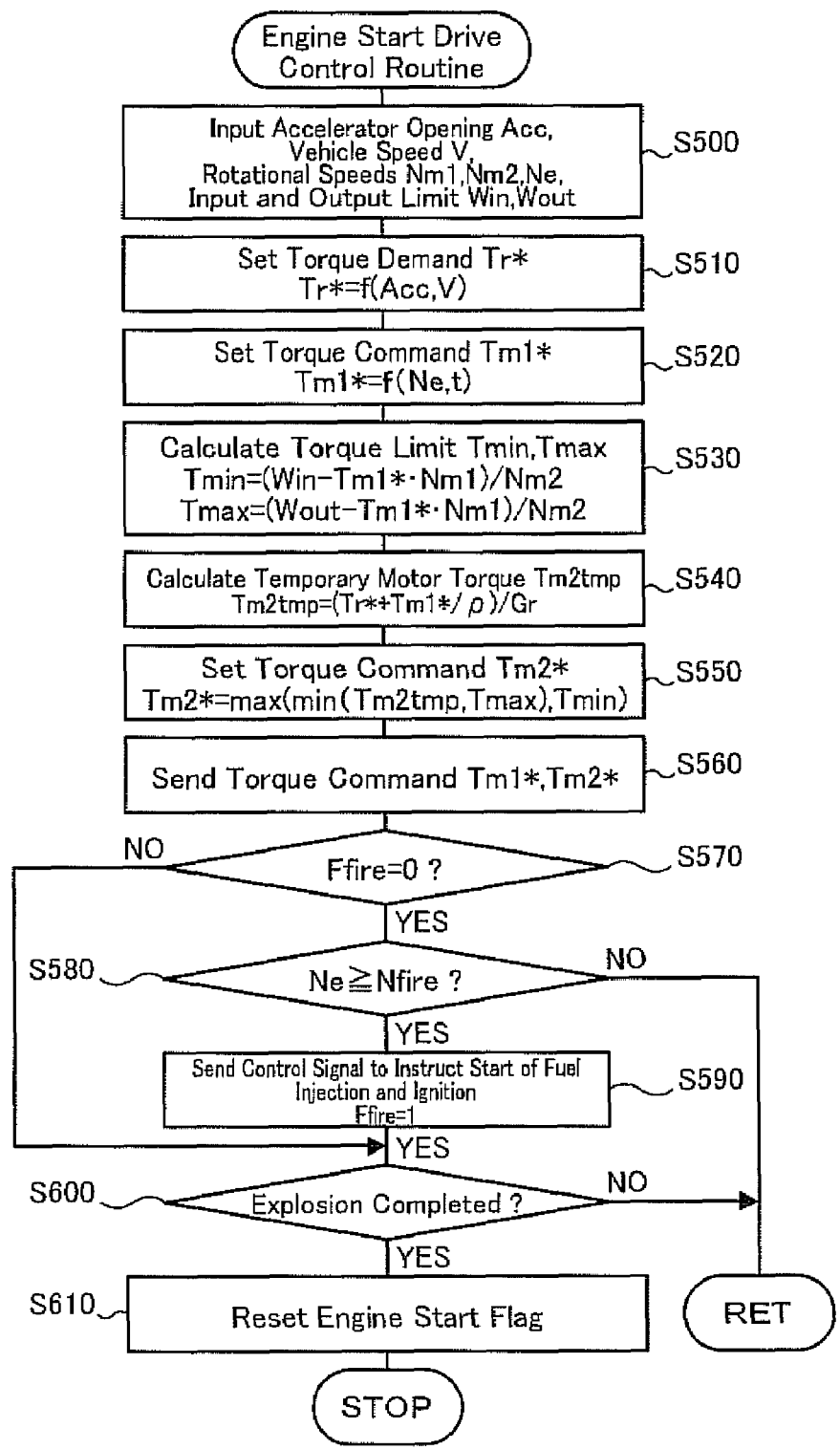
FIG. 10 is a flowchart exemplifying an engine start drive control routine executed by the hybrid ECU 70 of the embodiment.

As described above, when the engine start flag is set at Step S450, the hybrid ECU 70 executes an engine start drive control routine. FIG. 10 is a flowchart exemplifying the engine start drive control routine. At the start of the engine start drive control routine, the CPU 72 of the hybrid ECU 70 executes an input process of data required for the control such as the accelerator opening Acc from the accelerator pedal position sensor 84, the vehicle speed V from the vehicle speed sensor 87, the rotation speeds Nm1 and Nm2 of the motors MG1 and MG2, a rotational speed Ne of the engine 22 from the engine ECU 24, and the input limit Win and the output limit Wout of the battery 50 (step S500). After the data input at Step S500, the CPU 72 sets the torque demand Tr* to be output to the ring gear shaft 32a based on the accelerator opening Acc, the vehicle speed V and the torque demand setting map shown in FIG. 8 (Step S510).

Then, the CPU 72 sets the torque command Tm1* of the motor MG1 based on the rotational speed Ne of the engine 22 input at Step S500 and an elapsed time t from the start of the routine counted by the timer 78 (Step S520). In the embodiment, the torque command Tm1* is set to a cranking torque corresponding to given rotational speed Ne and the elapsed time t that is derived from a cranking torque setting map previously stored in the ROM 74 and defining a relationship between the rotational speed Ne of the engine 22, the elapsed time t and the cranking torque upon the cranking of the engine 22. After setting the torque command Tm1*, the CPU 72 calculates the lower torque limit Tmin and the upper torque limit Tmax as allowable minimum and maximum torques to be output from the motor MG2 according to the above equations (5) and (6) (Step S530). Further, the CPU 72 calculates the temporary motor torque Tm2tmp as the torque value to be output from the motor MG2 in accordance with an Equation (8) given below (Step S540). Then, the CPU 72 sets the torque command Tm2* of the motor MG2 to a value obtained by restricting the calculated temporary motor torque Tm2tmp by the lower and the upper torque limits Tmin and Tmax (Step S550). The CPU 72 sends the set torque command Tm1* and Tm2* to the motor ECU 40 (Step S560).

By setting the torque command Tm2* of the motor MG2 in such a manner, the torque command Tm2* for outputting the torque demand Tr* to the ring gear shaft 32a can be restricted within the range of the input limit Win and the base output limit Woutb or the output limit Wout that is restricted based on the deterioration factor D while cancelling a torque (=-1/ρ·Tm1* in FIG. 9) as a reaction force with respect to a driving force applied to the ring gear shaft 32a in accordance with torque for cranking the engine 22 (torque command Tm1* of the motor MG1). The Equation (8) used at Step S550 is readily introduced from the alignment chart of FIG. 9.

$$Tm2tmp=(Tr^*+Tm1^*/\rho)/Gr \quad (8)$$

After the process of Step S550, the CPU 72 determines whether or not a fuel injection start flag Ffire is value "0" (Step S570). The fuel injection start flag Ffire is set to value "0" until a fuel injection and an ignition control are started and is set to value "1" when the fuel injection and the ignition control are started. When the fuel injection start flag Ffire is value "0", the CPU 72 further determines whether or not the rotational speed Ne of the engine 22 reaches a ignition start rotational speed Nfire (for example, 1000-1200 rpm) at Step S580. When the rotational speed Ne of the engine 22 does not reach the ignition start rotational speed Nfire, the CPU 72 repeatedly executes the processes of and after Step S500. When the rotational speed Ne of the engine 22 reaches the ignition start rotational speed Nfire, the CPU 72 send a control signal to instruct the start of the fuel injection and the ignition control to the engine ECU 24 and sets the fuel injection start flag Ffire to value "1" (Step S590). Then, the CPU 72 determines whether or not an explosion of the engine 22 is completed (Step S600). When the explosion of the engine 22 is not completed, the CPU 72 executes the processes of and after Step S500. Once the fuel injection start flag Ffire is set to value "1" at Step S590, the CPU 72 determines that the fuel injection start flag Ffire is value "1" at Step S570 and skips the comparison processes of Steps S580 and S590. Then, the CPU 72 determines whether or not the explosion of the engine 22 is completed (Step S600). When the explosion of the engine 22 is completed, the CPU 72 resets the engine start flag (Step S610) and terminates the routine. After resetting the engine start flag, the hybrid ECU 70 executes a drive control routine at the time of the operation of the engine 22 (not shown).

While executing the engine start drive control routine, the extra output demand flag Fout2 is set to value "1" just before the start of the engine start drive control routine (Step S460 in FIG. 7) in the hybrid vehicle 20 of the embodiment. Accordingly, the output limit Wout is temporarily (during the time t0) set to the value equal to or more than the base output limit Woutb, that is, the value obtained by adding the temporary increase amount $\Delta W$ to the base output limit Woutb regardless of the value of the deterioration factor D (Step S250) when the positive determinations are made at Step S230 and 5240 while the output limit setting routine of FIG. 6 is executed. That is, in the hybrid vehicle 20, the limitation of the output limit Wout based on the deterioration factor D is released and the temporary increase of the output limit Wout is permitted when the engine 22 is started. As a result, the electric power required for the cranking of the motor MG1 is adequately ensured so that the engine 22 can be promptly started. Further, the torque equivalent to the torque demand Tr* can be output to the ring gear shaft 32a or the driveshaft while reducing an excessive limitation of the output of torque from the motor MG2.

As has been described above, in the hybrid vehicle 20, the output limit Wout of the battery 50 is set to the base output limit Woutb that is the allowable discharging electric power based on the state of the battery 50 when the deterioration factor D is less than the limitation start threshold value Dtag that is smaller than the reference value Dlim (Step S160 in FIG. 6). When the deterioration factor D is equal to or more than the limitation start threshold value Dtag, the output limit Wout is set to smaller electric power than the base output limit Woutb so as to retain the deterioration factor D equal to or less than the reference value Dlim by restricting the discharge of the battery 50 (Step S280 in FIG. 6). Further, when the extra output demand flag Fout1 or Fout2 is set to value "1", the output limit Wout is corrected to temporarily increase on the condition that the positive determination is made at Steps S180 and S190 or Steps S230 and S240 (Steps S200 or S250 in FIG. 6). Then, the engine 22, the motor MG1 and MG2 are controlled so as to ensure the output of torque equivalent to the torque demand Tr* to the ring gear shaft 32a without the operation of the engine 22 while restricting the discharge electric power of the battery 50 within the range of the output limit Wout when the driving power demand Pr* based on the torque demand Tr* is less than the engine start determination power Pref obtained by subtracting the engine start electric power Wcrk and the like from the base output limit Woutb while the operation of the engine 22 is stopped (Steps S390-S440 in FIG. 7). When the driving power demand Pr* is equal to or more than the engine start determination power Pref while the operation of the engine 22 is stopped, the engine 22, the motor MG1 and MG2 are controlled so as to ensure the output of torque equivalent to the torque demand Tr* to the ring gear shaft 32a with the start of the engine 22 by the cranking of the motor MG1 while restricting the discharge electric power of the battery 50 within the range of the output limit Wout of the battery 50 (Steps S450 in FIG. 7 and FIG. 10).

By comparing the driving power demand Pr* with the engine start determination power Pref having a tendency of reducing the start of the engine 22 in comparison with the threshold value based on the output limit Wout and determining whether or not the engine 22 is to be started, the operation stop region of the engine 22 can be adequately ensured without being narrowed even when the deterioration factor D becomes equal to or more than the limitation start threshold value Dtag while the operation of the engine 22 is stopped. Further, the discharge electric power of the battery 50 is always restricted within the range of the output limit Wout while the driving power demand Pr* is less than the engine start determination power Pref. Thus, torque output to the ring gear shaft 32a may be slightly reduced while the driving power demand Pr* is less than the engine start determination power Pref, however, the deterioration of the battery 50 due to the discharge thereof can be prevented from beginning. Accordingly, the hybrid vehicle 20 is capable of reducing the deterioration of the battery 50 due to the discharge thereof and adequately ensuring the operation stop region of the engine 22.

Further, in the hybrid vehicle 20, the output limit Wout is temporarily set to electric power equal to or more than the base output limit Woutb or the sum of the base output limit Woutb and the temporary increase amount $\Delta W$ regardless of the value of the calculated deterioration factor D when the driving power demand Pr* is equal to or more than the engine start determination power Pref while the operation of the engine 22 is stopped and the engine 22 is started by the cranking of the motor MG1 (Step S250 in FIG. 6). That is, the battery 50 may not be deteriorated even if the discharge electric power of the battery 50 exceeds the output limit Wout based on the deterioration factor D in a very short time when the deterioration factor D becomes equal to or more than the limitation start threshold value Dtag. Accordingly, in the hybrid vehicle 20, the output limit Wout is temporarily set to the electric power equal to or more than the base output limit Woutb regardless of the value of the deterioration factor D when the engine 22 is started by the cranking of the motor MG1. Thus, the deterioration of the battery 50 due to the discharge thereof can be reduced and the engine 22 can be favorably started by the cranking of the motor MG1.

The output limit Wout is temporarily increased only after the driving power demand Pr* becomes equal to or more than the engine start determination power Pref when the deterioration factor D is equal to or more than the limitation start threshold value Dtag. Thus, the engine 22 can be favorably started while increasing the output limit Wout to some extent upon the start of the engine 22. Further, the deterioration of the battery 50 due to the discharge thereof can be reduced both prior to and subsequent to the start of the engine 22. Furthermore, the engine start determination power Pref is obtained by subtracting the engine start electric power Wcrk that is electric power input or output by the motor MG1 performing the cranking to start the engine 22, the air conditioning electric power Wac and the margin electric power Wmrg from the sum of the base output limit Woutb and the temporary increase amount $\Delta W$. Thus, the engine start determination power Pref can be appropriately calculated. However, the temporary increase amount $\Delta W$ is not necessary to be taken into account when the temporary increase amount $\Delta W$ is not added to the output limit Wout. Further, the air conditioning electric power Wac and the margin electric power Wmrg are not necessary to be taken into account.

In the hybrid vehicle 20, the deterioration factor D is the value based on the integrated value of the electric current flowing through the battery 50. Thus, the deterioration factor D can be calculated so as to appropriately indicate a deterioration degree of the battery 50. Further, the process of restricting the output limit Wout of the battery 50 based on the deterioration factor D is especially preferable for the battery 50 that is the lithium ion secondary battery being characteristic of beginning deterioration due to continuous discharge at the high current level even when the inter-terminal voltage Vb does not reached to the lower limit voltage Vbmin. However, the deterioration factor D may be computable with regard to various other types of batteries, for example, a nickel hydrogen battery. Accordingly, the battery 50 may be any suitable type of the secondary cell other than the lithium ion secondary battery.

Figure 11:
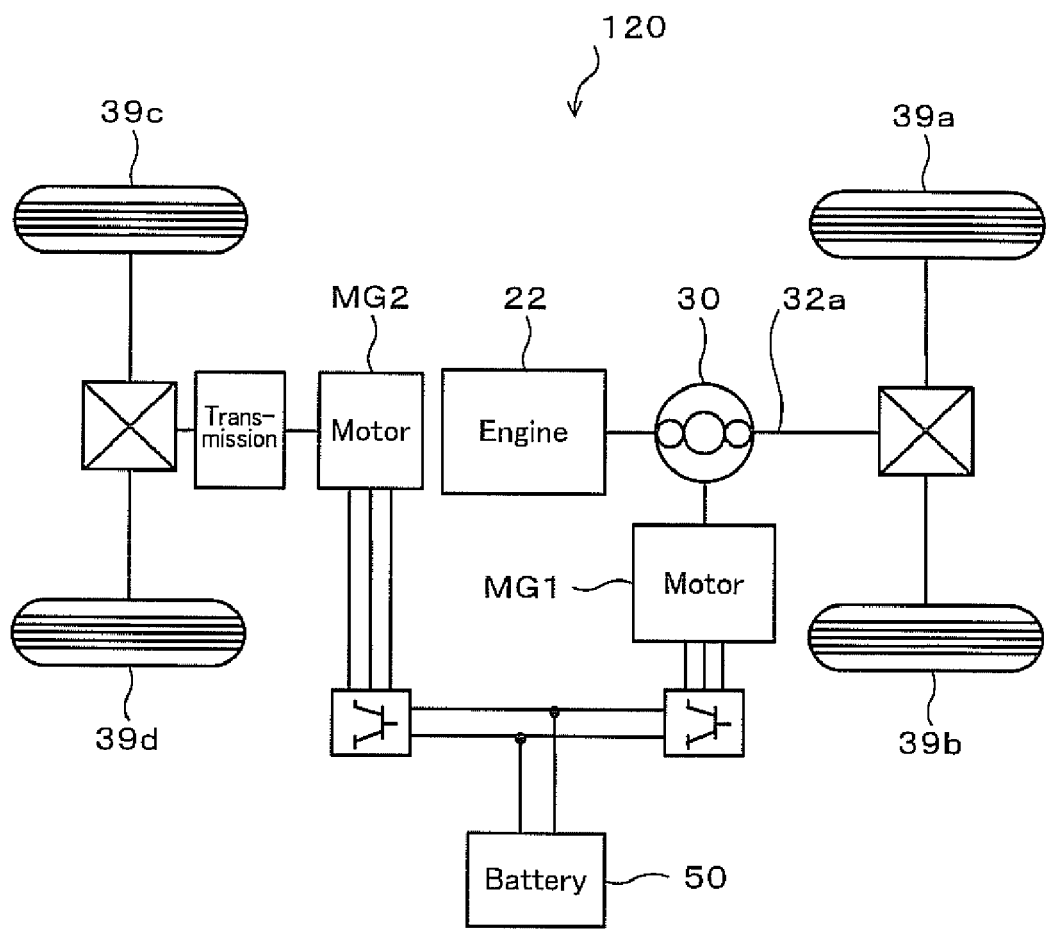
FIG. 11 is a schematic block diagram of a hybrid vehicle 120 according to a modification of the present invention.

In the hybrid vehicle 20 of the embodiment, the ring gear shaft 32a is connected to the motor MG2 via the reduction gear 35 that reduces the rotational speed of the motor MG2 and transmits the reduced rotation speed to the ring gear shaft 32a. The reduction gear 35 may be replaced with a transmission that has two different speeds Hi and Lo or three or a greater number of different speeds and is designed to change the rotation speed of the motor MG2 and transmits the changed rotational speed to the ring gear shaft 32a. In the hybrid vehicle 20 of the embodiment, the power of the motor MG2 is subjected to speed reduction by the reduction gear 35 and is output to the ring gear shaft 32a. The technique of the invention is, however, not limited to the hybrid vehicle of this configuration but is also applicable to a hybrid vehicle 120 of a modified configuration shown in FIG. 11. In the hybrid vehicle 120 of FIG. 11, the power of the motor MG2 is output to another axle (an axle connected to wheels 39c and 39d) that is different from the axle connecting to the ring gear shaft 32a (the axle connected to the drive wheels 39a and 39b).

The correlation between the principal elements of the embodiments and modification examples, and the principal elements of the invention described in the "Summary of the Invention" section will now be described. That is, in the above described embodiment and modification examples, the engine 22 capable of outputting power to the ring gear shaft 32a corresponds to 'internal combustion engine', the motor MG2 capable of outputting power to the ring gear shaft 32a corresponds to the 'motor', the motor MG1 capable of performing the cranking to start the engine 22 corresponds to "electric cranking device", the battery 50 capable of supplying and receiving electric power from the motor MG1 and MG2 corresponds to "accumulator", the battery ECU 52 that calculates the deterioration factor D based on the charge-discharge current Ib of the battery 50 corresponds to "deterioration factor calculation module", the battery ECU 52 that executes the processes of Step S110-S160, 5270 and 5280 in FIG. 6 corresponds to "output limit setting module", the battery ECU 52 that executes the processes of Step S170-S260 in FIG. 6 corresponds to "output limit correction module", the hybrid ECU 70 that executes the process of Step S360 in FIG. 7 corresponds to "power demand setting module", a combination of the hybrid ECU 70 executing the processes of Step S370-S460 in FIG. 7 and the processes of Step S500-S610 in FIG. 10, the engine ECU 24 and the motor ECU 40 corresponds to "control module", the motor MG1 corresponds to "power generation motor", and the power distribution and integration mechanism 30 corresponds to "three shaft-type power input output structure".

The "internal combustion engine" is not limited to the engine 22 that consumes a hydrocarbon fuel, such as gasoline or light oil and outputs power, but may be an internal combustion engine of any other design, for example, a hydrogen engine. The "motor", "electric cranking device" and the "power generation motor" are not limited to the motor MG2 and the motor MG1 constructed as the synchronous motor generator but may have any other configuration or design, for example, an induction motor. The "deterioration factor calculation module" is not limited to the battery ECU 52 but may be implemented by any configuration of calculating the deterioration factor based on the value of electric current flowing through the accumulator, the deterioration factor indicating that the deterioration of the accumulator due to the discharge of the accumulator begins when the deterioration factor exceeds the predetermined reference value. The "output limit setting module" is not limited to the battery ECU 52 but may be implemented by any configuration of setting the output limit of the accumulator to the base allowable discharging electric power when the deterioration factor is less than the predetermined limitation start threshold value that is smaller than the reference value and setting the output limit to electric power smaller than the base allowable discharging electric power so as to make the deterioration factor become equal to or less than the reference value when the deterioration factor is equal to or more than the limitation start threshold value. The "output limit correction module" is not limited to the battery ECU 52 but may be implemented by any configuration of correcting the output limit so as to temporarily increase when the predetermined condition is satisfied. The "power demand setting module" is not limited to the hybrid ECU 70 but may be implemented by any configuration of setting the power demand required for the driveshaft based on the torque demand that is to be output to the driveshaft. The "control module" is not limited to the combination of the hybrid ECU 70, the engine ECU 24 and the motor ECU 40 but may be implemented by a single electronic control unit, for example. The "three shaft-type power input output structure" is not limited to the power distribution and integration mechanism 30 but may be implemented by a double-pinion planetary gear mechanism or a differential gear. In any case, the correspondence between the main elements in the embodiment and the variant and the main elements in the invention described in "Summary of the Invention" do not limit the elements in the invention described in "Summary of the Invention" since the embodiment is an example for describing in detail the best mode for carrying out the invention described in "Summary of the Invention". Specifically, the embodiment is merely a detailed example of the invention described in "Summary of the Invention", and the invention described in "Summary of the Invention" should be construed on the basis of the description therein.

Namely the embodiment and its modified examples discussed above are to be considered in all aspects as illustrative and not restrictive. There may be many other modifications, changes, and alterations without departing from the scope or spirit of the main characteristics of the present invention.

The present invention can be used in a manufacturing industry or the like of a power output apparatus and a vehicle. The disclosure of Japanese Patent Application No. 2008-241304 filed on Sep. 19, 2008 including specification, drawings and claims is incorporated herein by reference in its entirety.

What is claimed is:

1. A power output apparatus that outputs power to a driveshaft, the power output apparatus comprising:

an internal combustion engine that outputs power to the driveshaft;

a motor that outputs power to the driveshaft;

an electric cranking device that performs a cranking to start the internal combustion engine;

an accumulator that supplies and receives electric power from the motor and the electric cranking device;

a deterioration factor calculation module configured to calculate a deterioration factor based on a value of electric current flowing through the accumulator, the deterioration factor indicating that a deterioration of the accumulator due to a discharge of the accumulator begins when the deterioration factor exceeds a predetermined reference value;

an output limit setting module configured to set an output limit of the accumulator to a base allowable discharging electric power that is an allowable discharging electric power based on a state of the accumulator when the calculated deterioration factor is less than a predetermined limitation start threshold value that is smaller than the reference value, the output limit setting module set the output limit to electric power smaller than the base allowable discharging electric power so as to make the deterioration factor become equal to or less than the reference value when the calculated deterioration factor is equal to or more than the limitation start threshold value;

an output limit correction module configured to correct the set output limit so as to temporarily increase the output limit when a predetermined condition is satisfied;

a power demand setting module configured to set a power demand required for the driveshaft based on a torque demand that is to be output to the driveshaft; and a control module configured to control the internal combustion engine, the motor and the electric cranking device so as to ensure an output of torque equivalent to the torque demand to the driveshaft without an operation of the internal combustion engine while restricting a discharge electric power of the accumulator within a range of the set or corrected output limit when the set power demand is less than an engine start determination threshold value obtained by subtracting a predetermined electric power from the base allowable discharging electric power while the operation of the internal combustion engine is stopped, the control module controlling the internal combustion engine, the motor and the electric cranking device so as to ensure the output of torque equivalent to the torque demand to the driveshaft with a start of the internal combustion engine by the cranking of the electric cranking device while restricting the discharge electric power of the accumulator within the range of the set or corrected output limit when the set power demand is equal to or more than the engine start determination threshold value while the operation of the internal combustion engine is stopped.

2. The power output apparatus according to claim 1, wherein the output limit correction module is capable of temporarily setting the output limit to electric power equal to or more than the base allowable discharge electric power regardless of a value of the deterioration factor when the power demand is equal to or more than the engine start determination threshold value while the operation of the internal combustion engine is stopped and the internal combustion engine is started by the cranking of the electric cranking device.

3. The power output apparatus according to claim 2, wherein the output limit correction module is capable of temporarily setting the output limit to electric power obtained by adding a predetermined temporary increase amount to the base allowable discharging electric power regardless of a value of the deterioration factor when the power demand is equal to or more than the engine start determination threshold value while the operation of the internal combustion engine is stopped and the internal combustion engine is started by the cranking of the electric cranking device.

4. The power output apparatus according to claim 1, wherein the output limit correction module temporarily increases the output limit only after the power demand becomes equal to or more than the engine start determination threshold value when the calculated deterioration factor is equal to or more than the limitation start threshold value.

5. The power output apparatus according to claim 1, wherein the deterioration factor is a value based on an integrated value of the electric current flowing through the accumulator.

6. The power output apparatus according to claim 1, wherein the engine start determination threshold value is obtained by subtracting an engine start electric power from the base allowable discharging electric power, the engine start electric power being electric power input or output by the electric cranking device performing the cranking to start the internal combustion engine.

7. The power output apparatus according to claim 1, wherein the electric cranking device is a power generation motor that is capable of inputting and outputting power, and wherein the power output apparatus further comprises a three shaft-type power input output structure connected to three shafts, the driveshaft, an engine shaft of the internal combustion engine, and a rotating shaft of the power generation motor, and configured to input and output power to a residual shaft based on powers input from and output to any two shafts among the three shafts.

8. The power output apparatus in accordance with claim 1, wherein the accumulator is a lithium ion secondary battery.

9. A vehicle including driving wheels connected to a driveshaft, the vehicle comprising:

an internal combustion engine that outputs power to the driveshaft;

a motor that outputs power to the driveshaft;

an electric cranking device that performs a cranking to start the internal combustion engine;

an accumulator that supplies and receives electric power from the motor and the electric cranking device;

a deterioration factor calculation module configured to calculate a deterioration factor based on a value of electric current flowing through the accumulator, the deterioration factor indicating that a deterioration of the accumulator due to a discharge of the accumulator begins when the deterioration factor exceeds a predetermined reference value;

an output limit setting module configured to set an output limit of the accumulator to a base allowable discharging electric power that is an allowable discharging electric power based on a state of the accumulator when the calculated deterioration factor is less than a predetermined limitation start threshold value that is smaller than the reference value, the output limit setting module set the output limit to electric power smaller than the base allowable discharging electric power so as to make the deterioration factor become equal to or less than the reference value when the calculated deterioration factor is equal to or more than the limitation start threshold value;

an output limit correction module configured to correct the set output limit so as to temporarily increase the output limit when a predetermined condition is satisfied;

a power demand setting module configured to set a power demand required for the driveshaft based on a torque demand that is to be output to the driveshaft; and a control module configured to control the internal combustion engine, the motor and the electric cranking device so as to ensure an output of torque equivalent to the torque demand to the driveshaft without an operation of the internal combustion engine while restricting a discharge electric power of the accumulator within a range of the set or corrected output limit when the set power demand is less than an engine start determination threshold value obtained by subtracting a predetermined electric power from the base allowable discharging electric power while the operation of the internal combustion engine is stopped, the control module controlling the internal combustion engine, the motor and the electric cranking device so as to ensure the output of torque equivalent to the torque demand to the driveshaft with a start of the internal combustion engine by the cranking of the electric cranking device while restricting the discharge electric power of the accumulator within the range of the set or corrected output limit when the set power demand is equal to or more than the engine start determination threshold value while the operation of the internal combustion engine is stopped.

10. A control method of a power output apparatus including a driveshaft, an internal combustion engine that outputs power to the driveshaft, a motor that outputs power to the driveshaft, an electric cranking device that performs a cranking to start the internal combustion engine, and an accumulator that supplies and receives electric power from the motor and the electric cranking device, the control method comprising the steps of:
  (a) calculating a deterioration factor based on a value of electric current flowing through the accumulator, the deterioration factor indicating that a deterioration of the accumulator due to a discharge of the accumulator begins when the deterioration factor exceeds a predetermined reference value;
  (b) setting an output limit of the accumulator to a base allowable discharging electric power that is an allowable discharging electric power based on a state of the accumulator when the deterioration factor calculated at Step (a) is less than a predetermined limitation start threshold value that is smaller than the reference value, and setting the output limit to electric power smaller than the base allowable discharging electric power so as to make the deterioration factor become equal to or less than the reference value when the deterioration factor calculated at Step (a) is equal to or more than the limitation start threshold value;
  (c) correcting the output limit set at Step (b) so as to temporarily increase the output limit when a predetermined condition is satisfied; and
  (d) controlling the internal combustion engine, the motor and the electric cranking device so as to ensure an output of torque equivalent to the torque demand to the driveshaft without an operation of the internal combustion engine while restricting a discharge electric power of the accumulator within a range of the set or corrected output limit when a power demand required for the driveshaft is less than an engine start determination threshold value obtained by subtracting a predetermined electric power from the base allowable discharging electric power while the operation of the internal combustion engine is stopped, the power demand being set based on a torque demand that is to be output to the driveshaft, and controlling the internal combustion engine, the motor and the electric cranking device so as to ensure the output of torque equivalent to the torque demand to the driveshaft with a start of the internal combustion engine by the cranking of the electric cranking device while restricting the discharge electric power of the accumulator within the range of the set or corrected output limit when the set power demand is equal to or more than the engine start determination threshold value while the operation of the internal combustion engine is stopped.

* * * * *

UNITED STATES PATENT AND TRADEMARK OFFICE
CERTIFICATE OF CORRECTION

PATENT NO.        : 7,836,987 B2                                    Page 1 of 1
APPLICATION NO.   : 12/558636
DATED             : November 23, 2010
INVENTOR(S)       : Takanori Aoki It is certified that error appears in the above-identified patent and that said Letters Patent is hereby corrected as shown below:

Column 13, line 35 - delete "AD" and insert --$\Delta$D--
Column 15, line 1 - delete "5320" and insert --S320--
Column 19, line 21 - delete "5240" and insert --S240--
Column 21, line 49 - delete "5270" and insert --S270--
Column 21, line 49 - delete "5280" and insert --S280--

Signed and Sealed this
Twenty-eighth Day of June, 2011

David J. Kappos
*Director of the United States Patent and Trademark Office*